United States Patent
Suzuki et al.

(10) Patent No.: US 9,923,391 B2
(45) Date of Patent: Mar. 20, 2018

(54) CONNECTION DETECTING CIRCUIT

(71) Applicant: MITSUBISHI JIDOSHA KOGYO KABUSHIKI KAISHA, Tokyo (JP)

(72) Inventors: Yuya Suzuki, Nagoya (JP); Kuniaki Kaihara, Toyota (JP); Hiroyuki Sakai, Kariya (JP); Atsushi Kodama, Okazaki (JP); Takayuki Kono, Okazaki (JP); Kohsuke Okada, Chiryu (JP); Shohei Kawano, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 15/046,017

(22) Filed: Feb. 17, 2016

(65) Prior Publication Data
US 2016/0241060 A1 Aug. 18, 2016

(30) Foreign Application Priority Data

Feb. 18, 2015 (JP) .................................. 2015-029227

(51) Int. Cl.
*H02J 7/00* (2006.01)
*B60L 11/18* (2006.01)

(52) U.S. Cl.
CPC ......... *H02J 7/0036* (2013.01); *B60L 11/1816* (2013.01); *B60L 11/1838* (2013.01); *B60L 11/1861* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC . H02J 7/0036; B60L 11/1816; B60L 11/1861; B60L 11/1838

USPC .......................................................... 320/109
See application file for complete search history.

(56) References Cited

U.S. PATENT DOCUMENTS

2010/0079105 A1    4/2010   Iwanaga et al.
2010/0097105 A1    4/2010   Morita et al.
(Continued)

FOREIGN PATENT DOCUMENTS

CN          101523614 A      9/2009
CN          102803001 A     11/2012
(Continued)

OTHER PUBLICATIONS

Extended European Search Report dated Sep. 23, 2016 in corresponding European Application No. 16156309.3.

*Primary Examiner* — David V Henze-Gongola
(74) *Attorney, Agent, or Firm* — Birch, Stewart, Kolasch & Birch, LLP (57) ABSTRACT

A circuit includes a vehicle-side circuit, a charger-side circuit and a connecting part. The vehicle-side circuit includes a power source, a first resistor provided between the power source and the connecting part, a second resistor which is connected to the first resistor in series, a switch which turns on or off current supply from the power source, a voltage detector which detects a voltage at a connection point of the first resistor and the second resistor, a determining part which determines a state of connection between a vehicle-side connector and a charger-side connector and occurrence4 of a failure in the vehicle-side circuit based at least in part on the voltage detected by the voltage detector and an on/off state of the switch.

15 Claims, 8 Drawing Sheets

(56) References Cited

U.S. PATENT DOCUMENTS

| | | | |
|---|---|---|---|
| 2012/0098490 A1* | 4/2012 | Masuda | B60L 15/2009 320/109 |
| 2014/0197791 A1 | 7/2014 | Kaneyasu et al. | |
| 2015/0263560 A1* | 9/2015 | Ono | B60L 11/1818 320/136 |

FOREIGN PATENT DOCUMENTS

| | | |
|---|---|---|
| CN | 103928954 A | 7/2014 |
| JP | 2013-116030 A | 6/2013 |
| JP | 2013-158202 A | 8/2013 |
| WO | WO 2014/068380 A2 | 5/2014 |

* cited by examiner

| SECOND CIRCUIT CONFIGURATION (WITHOUT RESISTOR) | | |
|---|---|---|
| Tr ON | | Tr OFF (CHARGING) |
| HIGH-SIDE SHORTING | | FAILURE OF FIXING TO Tr ON |
| CONNECTOR UNCONNECTED | | |
| CONNECTOR CONNECTED OR GROUND SHORTING | | |
| FIXING TO Tr OFF/AD READING ABNORMALITY | | Tr OFF (NORMAL) |

AD CONVERTER INPUT VOLTAGE
- V α 1
- V α 2
- V α 4
- 0V

FIG. 3A

| FIRST CIRCUIT CONFIGURATION (WITH RESISTOR) | | |
|---|---|---|
| Tr ON | | Tr OFF (CHARGING) |
| HIGH-SIDE SHORTING | | FAILURE OF FIXING TO Tr ON |
| CONNECTOR UNCONNECTED | | |
| CONNECTOR CONNECTED | | |
| GROUND SHORTING | | |
| FIXING TO Tr OFF/AD READING ABNORMALITY | | Tr OFF (NORMAL) |

AD CONVERTER INPUT VOLTAGE
- V α 1
- V α 2
- V α 3
- V α 4
- 0V

| | Tr ON | Tr OFF (CHARGING) |
|---|---|---|
| AD CONVERTER INPUT VOLTAGE | | |
| Vβ1 | CONNECTOR CONNECTED OR GROUND SHORTING | FAILURE OF FIXING TO Tr ON |
| Vβ2 | CONNECTOR UNCONNECTED OR HIGH-SIDE SHORTING | |
| 0V | AD READING ABNORMALITY | Tr OFF (NORMAL) |

FIRST CIRCUIT CONFIGURAITON (WITH RESISTOR)

| AD CONVERTER INPUT VOLTAGE | Tr ON | Tr OFF (CHARGING) |
|---|---|---|
| — Vγ1 — | HIGH-SIDE SHORTING | FAILURE OF FIXING TO Tr ON |
| — Vγ2 — | CONNECTOR UNCONNECTED | |
| | CONNECTOR CONNECTED | |
| — Vγ3 — | GROUND SHORTING | |
| — Vγ4 — | AD READING ABNORMALITY | Tr OFF (NORMAL) |
| — 0V — | | |

FIG. 5C

SECOND CIRCUIT CONFIGURAITON (WITHOUT RESISTOR)

| AD CONVERTER INPUT VOLTAGE | Tr ON | Tr OFF (CHARGING) |
|---|---|---|
| — Vγ1 — | HIGH-SIDE SHORTING | ✕ |
| — Vγ2 — | CONNECTOR UNCONNECTED | |
| | CONNECTOR CONNECTED OR GROUND SHORTING | |
| — Vγ4 — | AD READING ABNORMALITY | Tr OFF (NORMAL)/FAILURE OF FIXING TO Tr ON |
| — 0V — | | |

*FIG. 6*

100 # CONNECTION DETECTING CIRCUIT

BACKGROUND

The present invention relates to a connection detecting circuit for detecting a state of connection between an electrically driven vehicle and a charger.

Conventionally, in electrically driven vehicles such as electric vehicles and plug-in hybrid vehicles, the vehicle is charged with power for driving by connecting a charger-side connector of a charger to a vehicle-side connector that is provided in a vehicle body.

If the charger-side connector is not connected to the vehicle-side connector correctly, charging may not be performed normally or the charger or the vehicle may be damaged due to coming-off of the charger-side connector. To avoid such an event, a technique is proposed in which a connection detecting circuit for detecting a state of connection between a vehicle-side connector and a charger-side connector is provided and a state of connection between the vehicle-side connector and the charger-side connector is determined using the connection detecting circuit.

In connection with such connection detecting circuits, techniques for detecting an occurrence of a circuit failure (high-side shorting, ground shorting, or the like) together with a state of connection to a charger are known. For example, the following Patent document 1 discloses a vehicular power shutting-off circuit that is equipped with an electric component provided in a vehicle, a housing unit that houses the electric component, and a stopping unit for stopping supply of power to a power line that is provided in the housing unit and connected to the electric component if it is determined that contact, from outside the housing unit, to the electric component and the power line has become possible. The power shutting-off circuit is further equipped with a connector that has a reception unit provided in the housing unit and a detachable unit capable of being attached to and detached from the reception unit and enables opening of the housing unit by detaching the detachable unit from the reception unit, a signal line that is connected when the detachable unit is fit into the reception unit and disconnected when the detachable unit is detached from the reception unit, and a voltage applying unit that applies a pulse-wave voltage having a fixed cycle to the signal line.

The stopping unit stops supply of power to the power line if determining that the high-level duration of a signal on the signal line has become longer than a preset time that is longer than a high-level duration, in each cycle, of the pulse waveform or the low-level duration of a signal on the signal line has become longer than a preset time that is longer than a low-level duration, in each cycle, of the pulse waveform.

[Patent document 1] JP-A-2013-116030

SUMMARY

Such connection detecting circuits have various circuit forms depending on, for example, differences in standards to comply with. For example, electrically driven vehicles may be charged at movement destinations and may use different chargers in respective charging acts. The charger-side connection detecting circuit is not always the same and may have such a circuit configuration that discrimination cannot be made between a connector unconnected state and a high-side-shorted state or a switch failure judgment cannot be made. As such, connection detecting circuits have room for improvements.

It is therefore to one advantageous aspect of the invention to provide a circuit that is advantageous in detection of a state of connection between a vehicle-side connector and a charger-side connector used for charging of an electrically driven vehicle and a failure of the connection detecting circuit.

According to one aspect of the invention, there is provided a circuit, comprising:
a vehicle-side connector, provided in an electrically driven vehicle, and configured to be connected to a charger-side connector which is provided in an external charger for supplying power to a battery installed in the electrically driven vehicle; and
a vehicle-side circuit, provided at the electrically driven vehicle, and configured to be connected via a connecting part to the charger-side connector being grounded in a state that the vehicle-side connector and the charger-side connector are connected to each other;
wherein the vehicle-side circuit includes:
a power source;
a first resistor provided between the power source and the connecting part;
a second resistor which is connected to the first resistor in series;
a switch which turns on or off current supply from the power source;
a voltage detector which detects a voltage at a connection point of the first resistor and the second resistor; and
a determining part which determines a state of connection between the vehicle-side connector and the charger-side connector and occurrence of a failure in the vehicle-side circuit based at least in part on the voltage detected by the voltage detector and an on/off state of the switch The second resistor may be provided on the connecting part side of the first resistor and is smaller in resistance than the first resistor.

The circuit may be configured such that:
a charger-side resistor is connected to the charger-side connector, and
the determining part, when the switch is controlled to be on,
determines that the vehicle-side circuit is in failure if the detected voltage is higher than or equal to a first threshold voltage,
determines that the vehicle-side connector and the charger-side connector are not connected to each other if the detected voltage is lower than the first threshold voltage and higher than or equal to a second threshold voltage that is lower than the first threshold voltage,
determines that the vehicle-side connector and the charger-side connector are connected to each other if the detected voltage is lower than the second threshold voltage and higher than or equal to a third threshold voltage that is lower than the second threshold voltage, and
determines that the vehicle-side circuit is in failure if the detected voltage is lower than the third threshold voltage.

The determining part, when the switch is controlled to be off, may determine that the vehicle-side circuit is in failure if the detected voltage is higher than or equal to a fourth threshold voltage that is lower than the third threshold voltage.

The switch may be a transistor.

The switch may be controlled to be off when the vehicle-side connector and the charger-side connector are connected to each other and the battery is being charged from the external charger, and may be controlled to be on when the battery is not being charged from the external charger.

In the aspect of the invention, the vehicle-side circuit of the connection detecting circuit is equipped with the two resistors and a state of connection between the vehicle-side connector and the charger-side connector and occurrence/non-occurrence of a failure in the connection detecting circuit are determined by detecting a voltage at the connection point of the two resistors. Therefore, when the switch is controlled to be on, discrimination can be made between a connector unconnected state in which the vehicle-side connector and the charger-side connector are not connected to each other and a high-side-shorted state of the connection detecting circuit. This is advantageous in letting an erroneous start preventing function to work reliably. When the switch is controlled to be off, it becomes possible to determine whether the switch is operating normally or fixed to a turn-on state. This is advantageous in preventing formation of a current bypass circuit with another signal line.

In the aspect of the invention, the resistance of the second resistor which is relatively closer to the connecting part is smaller than that of the first resistor which is relatively closer to the power source. This is advantageous in obtaining a stable detection result by reducing noise at the time of voltage detection.

In the aspect of the invention, the connection detecting circuit can detect each of a state that the vehicle-side connector and the charger-side connector are not connected to each other and a state that the vehicle-side connector and the charger-side connector are connected to each other. This is advantageous in recognizing, in detail, a state of connection between the connectors and a state of the connection detecting circuit.

In the aspect of the invention, the connection detecting circuit can determine occurrence/non-occurrence of a failure in the vehicle-side circuit when the switch is controlled to be off. This is advantageous in preventing formation of a current bypass circuit with another signal line.

In the aspect of the invention, the switch is a transistor. This is advantageous over the case of using a mechanical switch in increasing the on/off switching speed of the switch and lowering the probability that, for example, the switch is fixed to a certain state due to heat, for example.

In the aspect of the invention, the switch is controlled to be off while the vehicle-side connector and the charger-side connector are connected to each other and the drive battery is being charged from the external charger. And the switch is controlled to be on while the drive battery is not being charged from the external charger. This is advantageous in preventing occurrence of a bypass circuit by disabling a current to flow through the connection detecting circuit during charging.

DETAILED DESCRIPTION OF EXEMPLIFIED EMBODIMENT

A connection detecting circuit according to a preferred embodiment of the present invention will be hereinafter described in detail with reference to the accompanying drawings.

Figure 1:
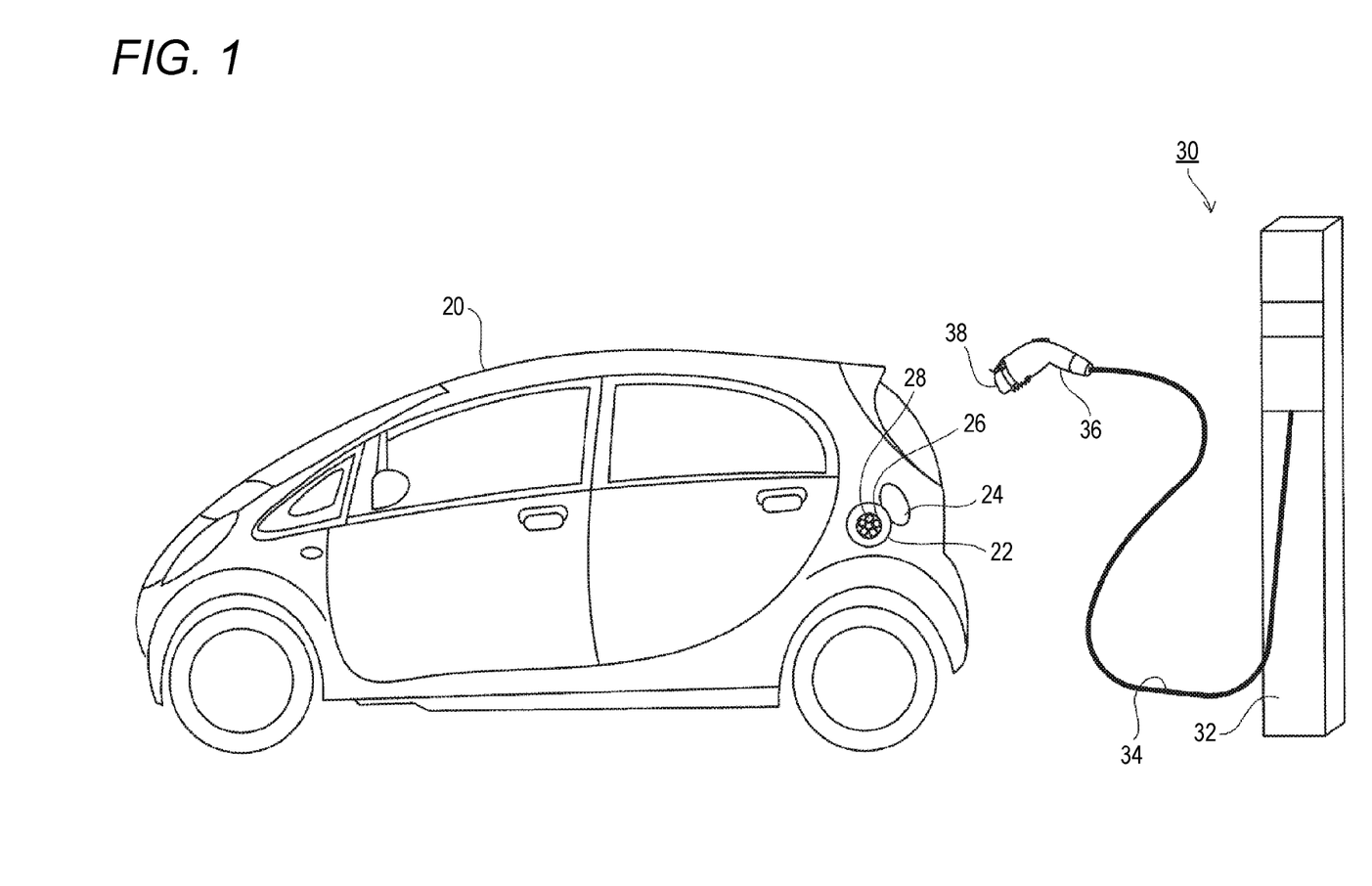
FIG. 1 shows an appearance of an electrically driven vehicle 20 which is equipped with a connection detecting circuit 10.

FIG. 1 shows an appearance of an electrically driven vehicle 20 which is equipped with a connection detecting circuit 10. The connection detecting circuit 10 (see FIG. 2) according to the embodiment is installed in the electrically driven vehicle 20. The electrically driven vehicle 20 has a drive battery 21 (see FIG. 6) for storing electric power for driving a drive motor of the vehicle 20 and runs on electric power as at least part of motive power.

In the embodiment, it is assumed that the electrically driven vehicle 20 is an electric vehicle that is driven by rotating a motor by electric power that is stored in the drive battery 21. The outer surface of the vehicle body of the electrically driven vehicle 20 is formed with a charging opening to which an external charger 30 is to be connected in charging the electrically driven vehicle 20.

The external charger 30 charges the drive battery 21 by supplying electric power to the electrically driven vehicle 20. In the embodiment, it is assumed that the external charger 30 is a quick charger for charging up a high-voltage power source in a short time. The external charger 30 includes a main unit 32, a charging cable 34, and a charger-side connector 36.

The main unit 32 is equipped with a control unit (charging controller) for controlling the operation of the external charger 30, a user interface for displaying a charging state and charging settings of the external charger 30, a manipulation picture, etc., and other things. The charging cable 34 extends from the main unit 32 and the charger-side connector 36 is provided at the tip of the charging cable 34.

The tip of the charger-side connector 36 is provided with a charger-side connecting part 38 to be connected to a vehicle-side connecting part 28 of a vehicle-side connector 26 (described later). The charger-side connecting part 38 is equipped with a power supply interface for supply of electric power to the electrically driven vehicle 20, a data interface for exchange of data with the electrically driven vehicle 20, a connection detection interface (i.e., part of a connecting part of the connection detecting circuit 10 (described later)), and other things.

The charging opening 22 of the electrically driven vehicle 20 is covered with a lid 24 and the vehicle-side connector 26 is disposed inside the charging opening 22. That is, the vehicle-side connector 26 is disposed in the charging opening 22 which is formed in the outer surface of the electrically driven vehicle 20 and has the lid 24 which can be opened and closed.

The surface of the vehicle-side connector 26 is provided with the vehicle-side connecting part 28 to be connected to the charger-side connecting part 38 of the charger-side connector 36. Like the charger-side connecting part 38, the vehicle-side connector 26 is equipped with a power supply interface, a data interface, a connection detection interface (i.e., part of a connecting part of the connection detecting circuit 10 (described later)), and other things.

To charge the electrically driven vehicle 20, the charger-side connector 36 is inserted into the charging opening 22, whereby a fit state, for example, is established between the charger-side connecting part 38 and the vehicle-side connecting part 28 and the charger-side connector 36 and the vehicle-side connector 26 are connected to each other. Electric power is transferred in this state.

The connection detecting circuit 10 (see FIG. 2) for detecting a state of connection between the vehicle-side connector 26 and the charger-side connector 36 is formed so as to span the electrically driven vehicle 20 and the external charger 30.

The electrically driven vehicle 20 controls, that is, enables or disables, running of itself according to the state of connection between the vehicle-side connector 26 and the charger-side connector 36 detected by the connection detecting circuit 10. More specifically, while the vehicle-side connector 26 and the charger-side connector 36 are connected to each other (a period before a start of charging and a period after an end of charging are included), an erroneous start preventing function of prohibiting an erroneous start is made effective. This is because the external charger 30 etc. may be damaged (e.g., a fracture of the charging cable 34) if the electrically driven vehicle 20 starts to run with the vehicle-side connector 26 and the charger-side connector 36 connected to each other.

Furthermore, a high-voltage current flows from the external charger 30 while the electrically driven vehicle 20 is being charged, charging by the external charger 30 is started after a sure connection between the charger-side connector 36 of the external charger 30 and the vehicle-side connector 26 is confirmed by the connection detecting circuit 10.

Figure 2:
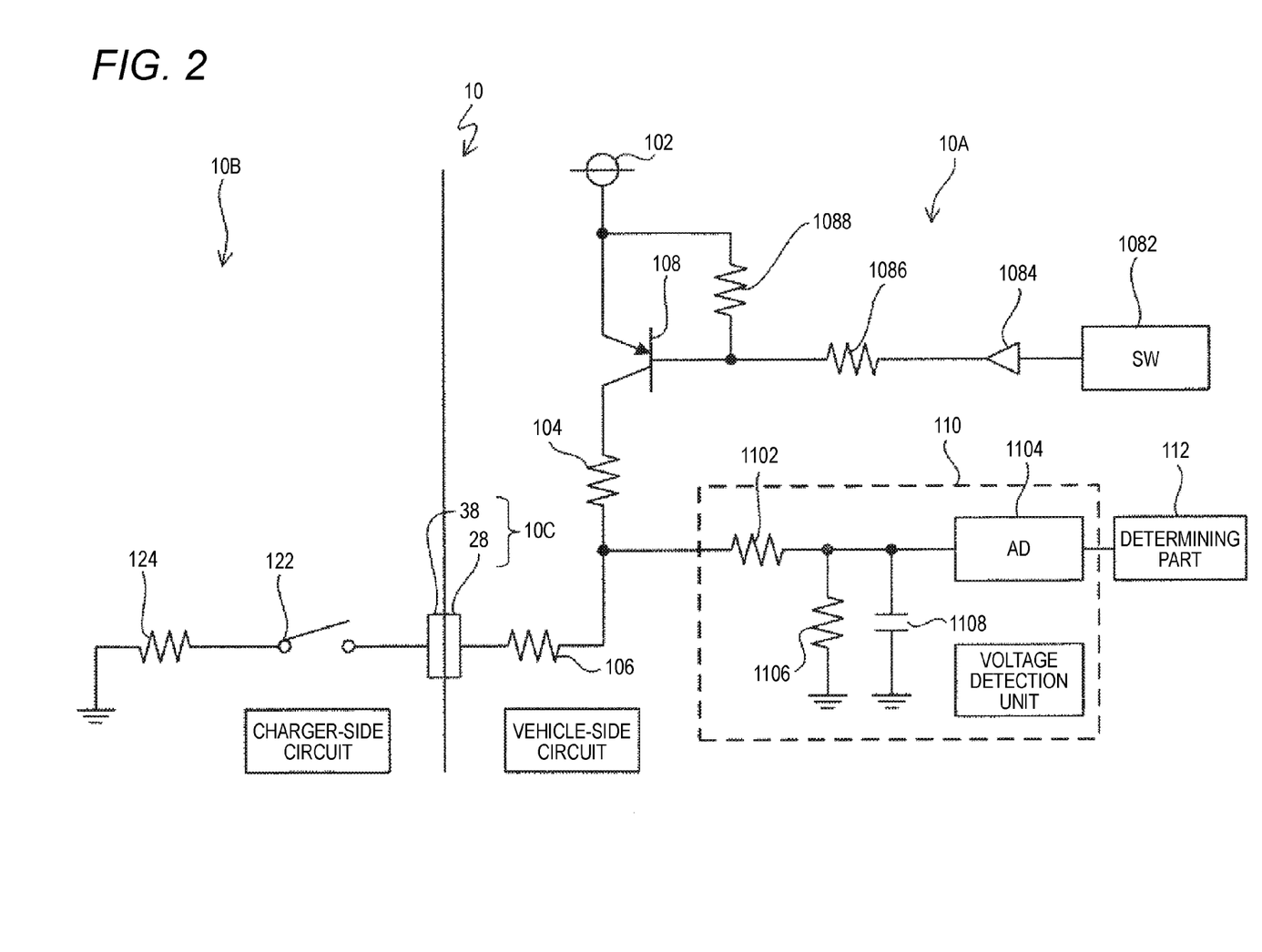
FIG. 2 is a circuit diagram showing an example configuration of the connection detecting circuit 10.

FIG. 2 is a circuit diagram showing an example configuration of the connection detecting circuit 10. The connection detecting circuit 10 consists of a vehicle-side circuit 10A provided on the electrically driven vehicle 20 side, a charger-side circuit 10B provided on the external charger 30 side, and a connecting part 100 which connects the vehicle-side circuit 10A and the charger-side circuit 10B in a state that the vehicle-side connector 26 and the charger-side connector 36 are connected to each other.

The connecting part 100 is formed by the connection detection interfaces (connection terminals) that are provided in the vehicle-side connecting part 28 of the vehicle-side connector 26 and the charger-side connecting part 38 of the charger-side connector 36.

In the charger-side circuit 10B, the charger-side connecting part 38 is grounded via a switch 122 and a charger-side resistor 124. The switch 122 is controlled to be on at the external charger 30 side if it is recognized that the vehicle-side connector 26 and the charger-side connector 36 are connected to each other, and is controlled to be off if it is recognized that the vehicle-side connector 26 and the charger-side connector 36 are not connected to each other.

An alternative configuration is possible in which the charger-side resistor 124 of the charger-side circuit 10B is omitted and the charger-side connecting part 38 is grounded via only the switch 122. That is, the external charger 30 may be any of ones that conform to various specifications and may be either equipped with or not equipped with the charger-side resistor 124 depending on the specification it complies with.

In the following description, the configuration of the charger-side circuit 10B having the charger-side resistor 124 will be referred to as a first circuit configuration and the configuration of the charger-side circuit 10B not having the charger-side resistor 124 will be referred to as a second circuit configuration.

The vehicle-side circuit 10A is equipped with a power source 102, a first resistor 104 provided between the power source 102 and the connecting part 10C, a second resistor 106 which is connected to the first resistor 104 in series, a switch 108 for turning on or off current supply from the power source 102, a voltage detector 110 for detecting a voltage at the connection point of the first resistor 104 and the second resistor 106, and a determining part 112 for determining a state of connection between the vehicle-side connector 26 and the charger-side connector 36 and occurrence/non-occurrence of a failure in the vehicle-side circuit 10A based on the voltage detected by the voltage detector 110 and an on/off state of the switch 108.

The power source 102 supplies electric power from a 12-V battery which is a power source for driving of, for example, vehicular devices installed in the electrically driven vehicle 20. The power source 102 operates in link with an ignition power source of the electrically driven vehicle 20 and employs a switching device IGCT (integrated gate-commutated thyristor; not shown).

The first resistor 104 and the second resistor 106 are connected to each other in series. In the embodiment, the second resistor 106 is provided on the connecting part 10C side of the first resistor 104. For example, the first resistor 104 and the second resistor 106 have a total resistance value of about 1,000±50Ω. In the embodiment, the resistance of the second resistor 106 is set smaller than that of the first resistor 104. More specifically, for example, the resistance of the first resistor 104 is set at 800Ω and the resistance of the second resistor 106 is set at 200Ω.

One reason for that the resistance of the second resistor 106 is set to be smaller than the resistance of the first resistor 104 is to reduce the noise when detecting the voltage. In the charger-side circuit 10B, a current noise which is a fluctuation of a current value due to electromagnetic wave etc. occurs, and this current noise intrudes from the charger-side circuit 10B to the vehicle-side circuit 10A. When the current noise passes through the second resistor 106, the current noise is amplified to a voltage noise by the relation V (voltage)=I (current)×R (resistance). Accordingly, the larger the resistance of the second resistor 106 is, the larger the amplitude of the voltage noise is, so as to have influence to the detection of the voltage by the voltage detector 110. Therefore, it is advantageous to set the resistance of the second resistor 106 in the small value. Thus, the resistance of the second resistor 106 is set to be smaller than the resistance of the first resistor 104.

The switch 108 is a transistor, and its emitter and collector are connected to the power source 102 and the first resistor 104, respectively. A switch 1082 which is switched according to whether or not the drive battery 21 is being charged or not, an inverter 1084, and a resistor 1086 are provided on the side of the base of the transistor. The switch 108 is controlled to be off when the vehicle-side connector 26 and the charger-side connector 36 are connected to each other and the drive battery 21 of the electrically driven vehicle 20 is being charged from the external charger 30, and is controlled to be on when the drive battery 21 is not being charged from the external charger 30.

The switch 108 is provided to disconnect the power source 102 so that no closed circuit is formed when a disconnection occurs in the grounding line that is provided between the vehicle-side connector 26 and the charger-side connector 36.

If the resistance of the first resistor 104 was set to be smaller than the resistance of the second resistor 106, it is made easier that huge electric current flows into the switch 108 when the huge electric current flows from the charger-side circuit 10 for some reason. Thus, it is concerned that function of the switch 108 is influenced. Therefore, by setting the resistance of the first resistor 104 to be larger than the resistance of the second resistor 106, it is possible to prevent the huge electric current from flowing into the switch 108 so as to protect the switch 108.

Figure 6:
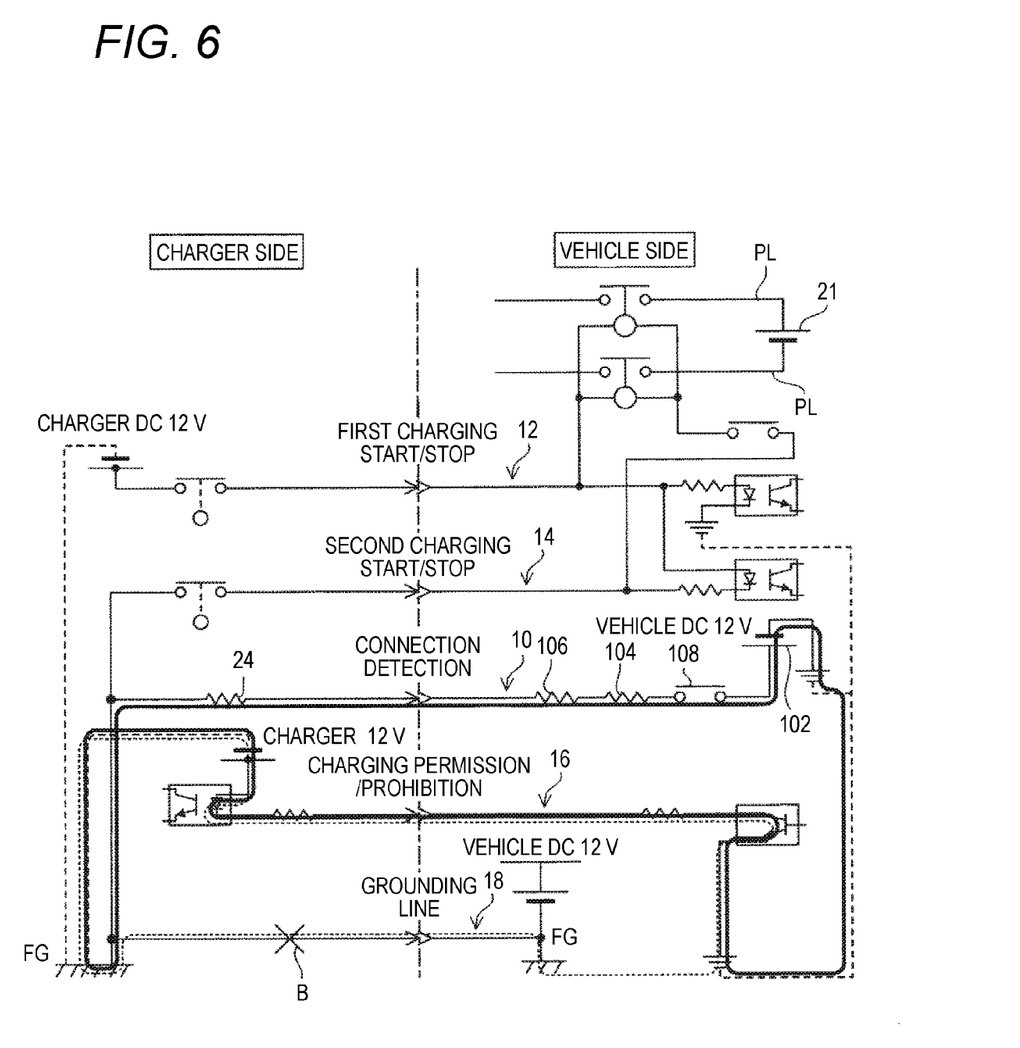
FIG. 6 schematically shows signal lines provided between a vehicle-side connector 26 and a charger-side connector 36.

FIG. 6 schematically shows signal lines provided between the vehicle-side connector 26 and the charger-side connector 36. In addition to a power line PL for supply of electric power to the drive battery 21, various check signal lines for reliable charging are provided between the vehicle-side connector 26 and the charger-side connector 36. The connection detecting circuit 10 of FIG. 2 includes part of those signal lines.

FIG. 6 shows not only part of the connection detecting circuit 10 but also a first charging start/stop signal line 12, a second charging start/stop signal line 14, a charging permission/prohibition signal line 16, and a grounding line 18. Part of the connection detecting circuit 10 is omitted in FIG. 6. These signal lines are required not to form a closed circuit with the charging permission/prohibition signal line 16 when the connection detecting circuit 10 is connected to the power source (12-V battery) of the electrically driven vehicle 20.

If the switch 108 were not provided, when a disconnection occurs in the grounding line 18 (e.g., at a position indicated by symbol B in FIG. 6), a bypass circuit indicated by a thick line would be formed and hence charging could not be stopped. In view of this, to prevent formation of a bypass circuit even when a disconnection occurs in the grounding line 18, the connection detecting circuit 10 is provided with the switch 108 which is turned on or off in link with whether or not charging is being performed from the external charger 30 to the drive battery 21.

Returning to FIG. 2, the voltage detector 110 is connected to the connection point of the first resistor 104 and the second resistor 106 and detects a potential difference between a potential at this point and a reference potential (ground potential). The voltage detector 110 is equipped with a resistor 1102 and an AD converter 1104 which a connected to each other in series and a resistor 1106 and a capacitor 1108 which are connected to the connection point of the resistor 1102 and the AD converter 1104. The circuit configuration of the voltage detector 110 shown in FIG. 2 is just an example, and the voltage detector 110 may have any of the configurations of various known voltage detection circuits.

The determining part 112 determines a state of connection between the vehicle-side connector 26 and the charger-side connector 36 and occurrence/non-occurrence of a failure in the vehicle-side circuit 10A based on a voltage detected by the voltage detector 110 and an on/off state of the switch 108.

Figure 3A:
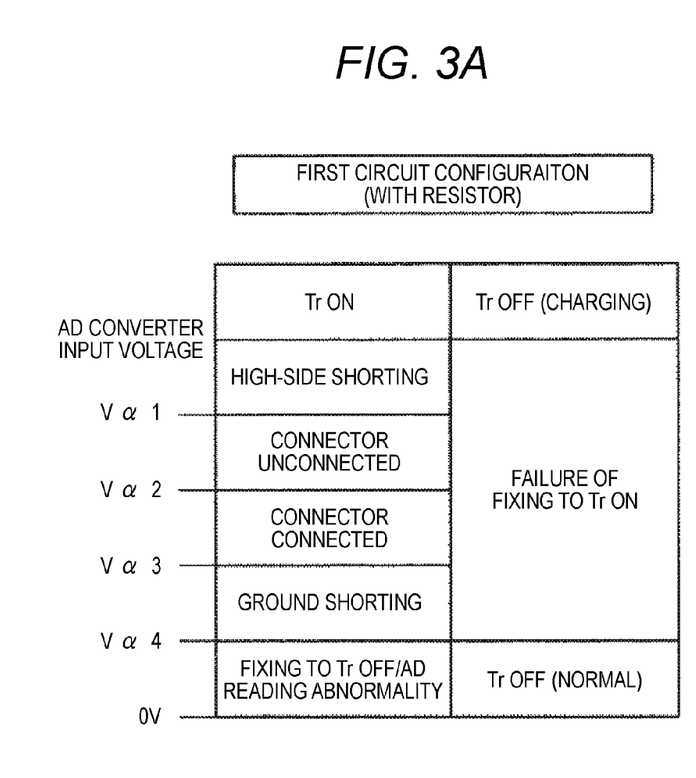
FIGS. 3A and 3B show how a determining part 112 makes a judgment.
Figure 3B:
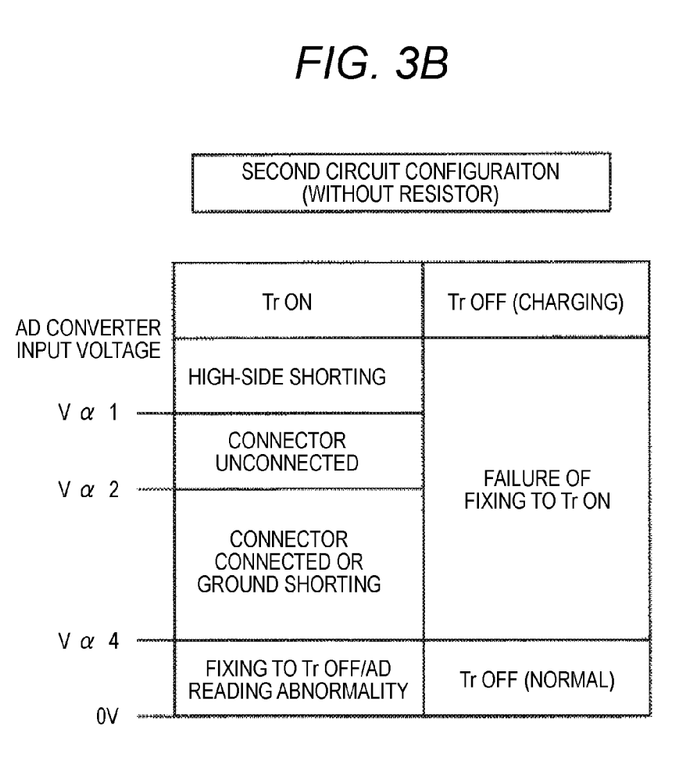

FIGS. 3A and 3B show how the determining part 112 makes a judgment in the case of the first circuit configuration in which the charger-side circuit 10B has the charger-side resistor 124 and in the case of the second circuit configuration in which the charger-side circuit 10B does not have the charger-side resistor 124, respectively.

First, referring to FIG. 3A, a description will be made of how the determining part 112 makes a judgment in the case of the first circuit configuration.

When the switch 108 (transistor Tr) is controlled to be on, that is, the drive battery 21 is not being charged, the voltage that is detected by the voltage detector 110 can have values corresponding to five respective states. Thus, the determining part 112 makes a judgment using four threshold voltages $V\alpha 1$, $V\alpha 2$, $V\alpha 3$, and $V\alpha 4$, ($V\alpha 1 > V\alpha 2 > V\alpha 3 > V\alpha 4$). The threshold voltage values $V\alpha 1$, $V\alpha 2$, $V\alpha 3$, and $V\alpha 4$ are set as appropriate based on characteristic values of elements constituting the vehicle-side circuit 10A and the charger-side circuit 10B (e.g., resistance values of the resistors).

If the voltage detected by the voltage detector 110 (hereinafter may be referred to simply as the "voltage") when the switch 108 is controlled to be on is higher than or equal to the first threshold voltage $V\alpha 1$, the determining part 112 determines that the vehicle-side circuit 10A is in failure, more specifically, the vehicle-side circuit 10A is high-side-shorted.

If the voltage is lower than the first threshold voltage $V\alpha 1$ and higher than or equal to the second threshold voltage $V\alpha 2$ which is lower than the first threshold voltage $V\alpha 1$, the determining part 112 determines that the current state is a connector unconnected state in which the vehicle-side connector 26 and the charger-side connector 36 are not connected to each other.

If the voltage is lower than the second threshold voltage $V\alpha 2$ and higher than or equal to the third threshold voltage $V\alpha 3$ which is lower than the second threshold voltage $V\alpha 2$, the determining part 112 determines that the vehicle-side connector 26 and the charger-side connector 36 are connected to each other.

The determining part 112 also determines that the vehicle-side circuit 10A is in failure if the voltage is lower than the third threshold voltage $V\alpha 3$. More specifically, if the voltage is lower than the third threshold voltage $V\alpha 3$ and higher than or equal to the fourth threshold voltage $V\alpha 4$ which is lower than the third threshold voltage $V\alpha 3$, the determining part 112 determines that the vehicle-side circuit 10A is ground-shorted.

If the voltage is lower than the fourth threshold voltage $V\alpha 4$, the determining part 112 determines that the switch 108 is fixed to a turn-off state or the voltage detector 110 has not detected the voltage correctly because of a failure of itself.

When the switch 108 (transistor Tr) is controlled to be off, that is, the vehicle-side connector 26 and the charger-side connector 36 are connected to each other and the drive battery 21 is being charged, the determining part 112 makes a judgment using the above-mentioned fourth threshold voltage $V\alpha 4$.

If the voltage detected by the voltage detector 110 when the switch 108 is controlled to be off is higher than or equal to the fourth threshold voltage $V\alpha 4$, the determining part 112 determines that the vehicle-side circuit 10A is in failure, more specifically, the switch 108 is fixed to a turn-on state.

If the voltage is lower than the fourth threshold voltage $V\alpha 4$, the determining part 112 determines that the switch 108 is operating normally.

Next, referring to FIG. 3B, a description will be made of how the determining part 112 makes a judgment in the case of the second circuit configuration.

When the switch 108 (transistor Tr) is controlled to be on, that is, the drive battery 21 is being charged, in the case of the second circuit configuration there is no potential difference between the state that the vehicle-side connector 26 and the charger-side connector 36 are connected to each other and the state that the vehicle-side circuit 10A is ground-shorted. Thus, the determining part 112 makes a judgment using three threshold voltages Vα1, Vα2, and Vα4, (the threshold voltage Vα3 is not used; Vα1>Vα2>Vα4).

If the voltage detected by the voltage detector 110 when the switch 108 is controlled to be on is higher than or equal to the first threshold voltage Vα1, the determining part 112 determines that the vehicle-side circuit 10A is in failure, more specifically, the vehicle-side circuit 10A is high-side-shorted.

If the voltage is lower than the first threshold voltage Vα1 and higher than or equal to the second threshold voltage Vα2, the determining part 112 determines that the current state is a connector unconnected state in which the vehicle-side connector 26 and the charger-side connector 36 are not connected to each other.

If the voltage is lower than the second threshold voltage Vα2 and higher than or equal to the fourth threshold voltage Vα4, the determining part 112 determines that the vehicle-side connector 26 and the charger-side connector 36 are connected to each other or the vehicle-side circuit 10A is in failure (more specifically, it is ground-shorted).

If the voltage is lower than the fourth threshold voltage Vα4, the determining part 112 determines that the vehicle-side circuit 10A is in failure (more specifically, the switch 108 is fixed to a turn-off state) or the voltage detector 110 is in failure and has not detected the voltage correctly.

When the switch 108 (transistor Tr) is controlled to be off, the determining part 112 makes a judgment in the same manners as in the case of the first circuit configuration.

If the voltage detected by the voltage detector 110 when the switch 108 is controlled to be off is higher than or equal to the fourth threshold voltage Vα4, the determining part 112 determines that the vehicle-side circuit 10A is in failure, more specifically, the switch 108 is fixed to a turn-on state.

If the voltage is lower than the fourth threshold voltage Vα4, the determining part 112 determines that the switch 108 is operating normally.

Figure 4A:
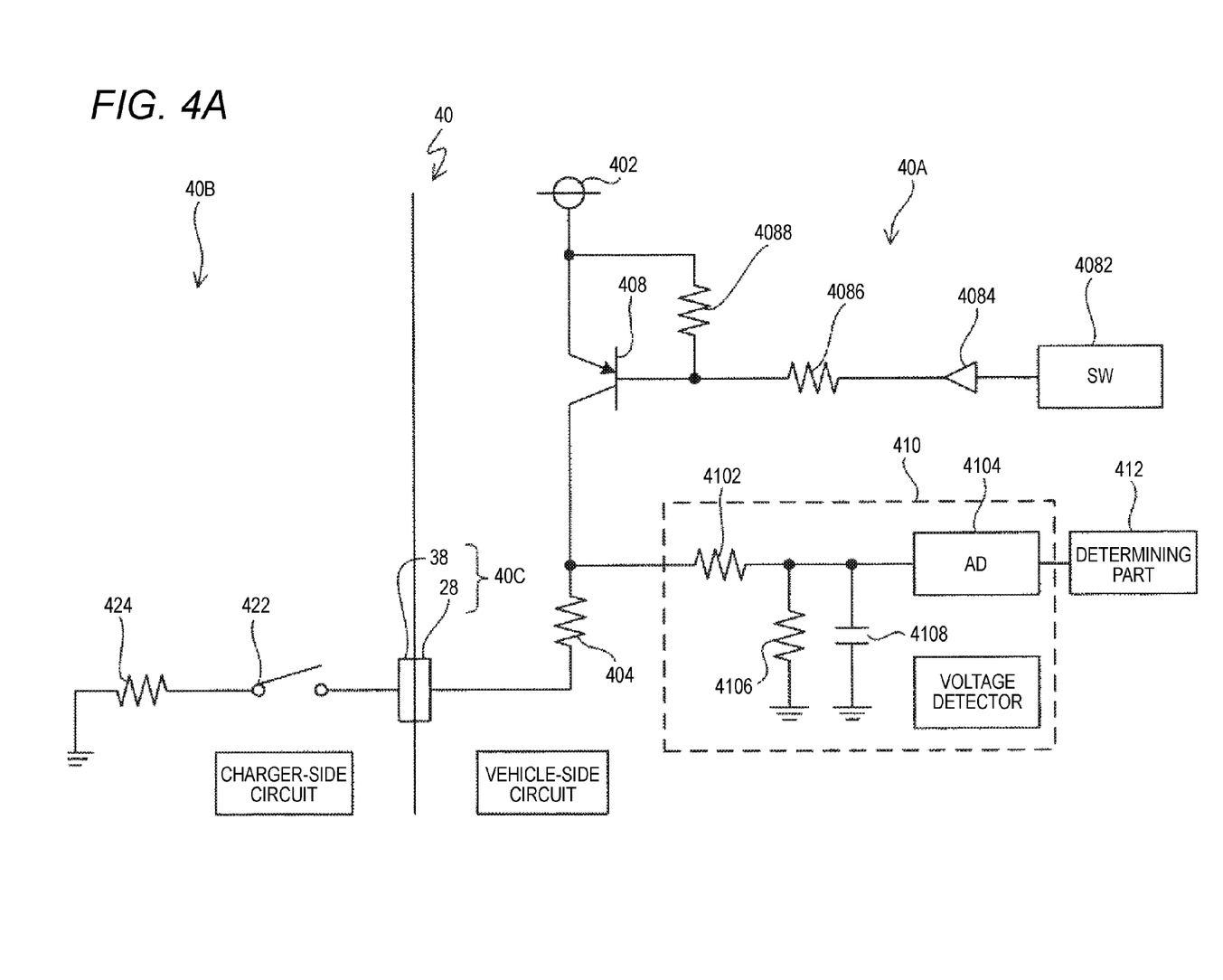
FIG. 4A is a circuit diagram of a conventional connection detecting circuit 40.
Figure 5A:
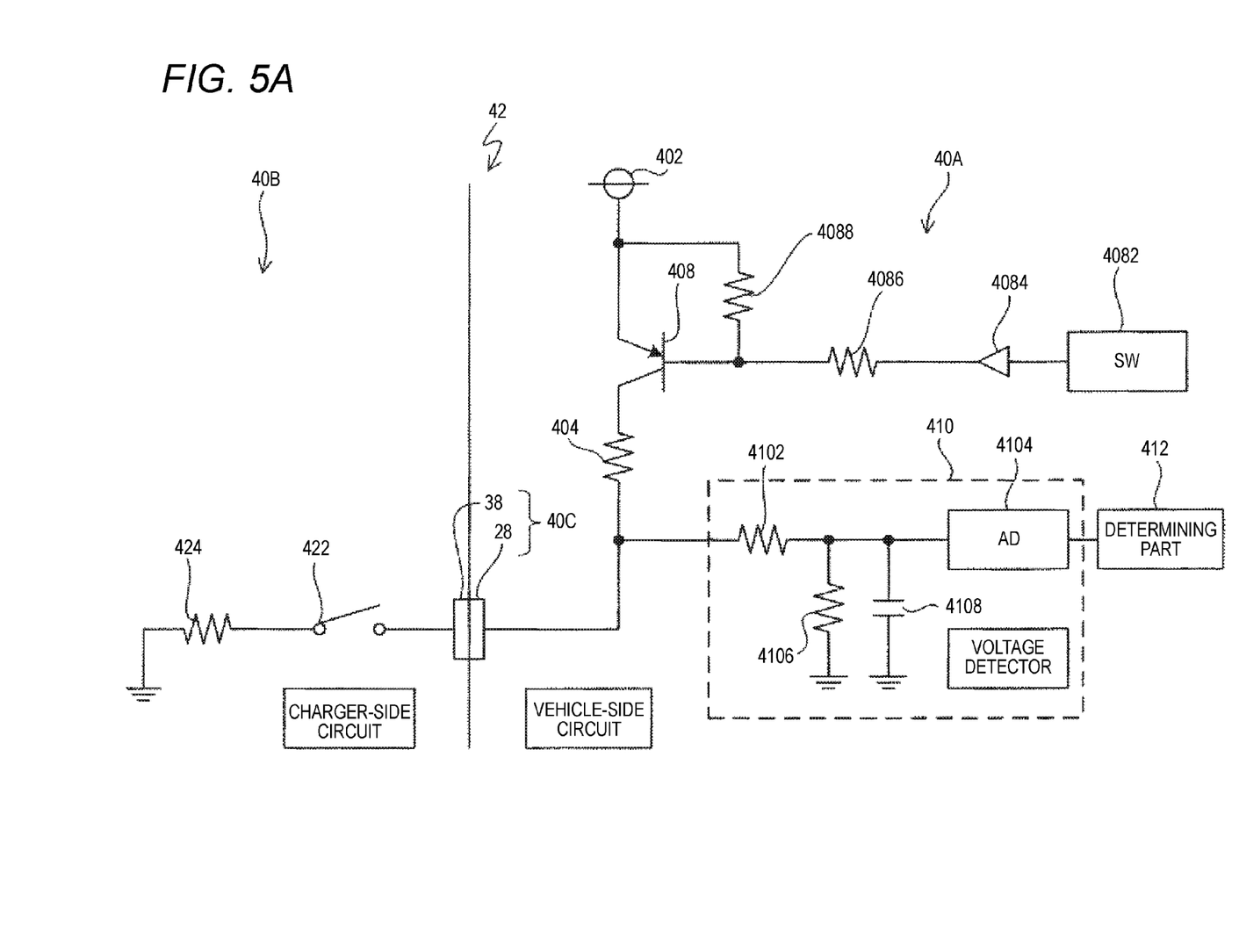
FIG. 5A is a circuit diagram of another conventional connection detecting circuit 42.

Now, the connection detecting circuit 10 according to the embodiment will be compared with conventional connection detecting circuits 40 and 42. FIGS. 4A and 5A are circuit diagrams of the conventional connection detecting circuits 40 and 42, respectively.

Like the connection detecting circuit 10 according to the embodiment, the conventional connection detecting circuit 40 shown in FIG. 4A consists of a vehicle-side circuit 40A provided on the electrically driven vehicle 20 side, a charger-side circuit 40B provided on the external charger 30 side, and a connecting part 40C which connects the vehicle-side circuit 40A and the charger-side circuit 40B in a state that the vehicle-side connector 26 and the charger-side connector 36 are connected to each other.

In the charger-side circuit 40B, the charger-side connecting part 38 is grounded via a switch 422 and a charger-side resistor 424 (charger-side resistor). This is a first circuit configuration. An alternative configuration is possible in which the charger-side resistor 424 of the charger-side circuit 40B is omitted and the charger-side connecting part 38 is grounded via only the switch 422. This is a second circuit configuration.

The vehicle-side circuit 40A is equipped with a power source 402, a resistor 404 provided between the power source 402 and the connecting part 40C, a switch 408 for turning on or off current supply from the power source 402, a voltage detector 410 for detecting a voltage at the connection point of the resistor 404 and the switch 408, and a determining part 412 for determining a state of connection between the vehicle-side connector 26 and the charger-side connector 36 based on the voltage detected by the voltage detector 410 and an on/off state of the switch 408.

A switch 4082, an inverter 4084, and a resistor 4086 are provided on the side of the base of the switch 408.

The voltage detector 410 is equipped with a resistor 4102 and an AD converter 4104 which a connected to each other in series and a resistor 4106 and a capacitor 4108 which are connected to the connection point of the resistor 4102 and the AD converter 4104.

The connection detecting circuit 40 of FIG. 4A is different from the connection detecting circuit 10 of FIG. 1 in that the only one resistor 404 is provided between the switch 408 and the connecting part 40C.

For example, the resistance of the resistor 404 is set at about 1,000±50Ω, which is the same as the total resistance of the first resistor 104 and the second resistor 106 of the connection detecting circuit 10.

Figure 4B:
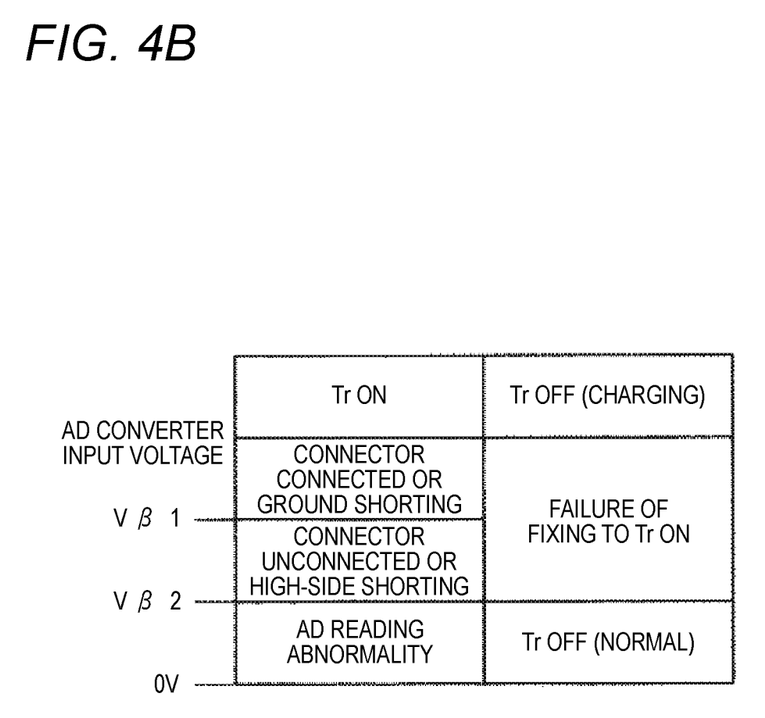
FIG. 4B shows how a determining part 412 makes a judgment.

FIG. 4B shows how the determining part 412 makes a judgment. In the connection detecting circuit 40 of FIG. 4A, the relationship between the voltage and the judgment result is the same irrespective of whether the charger-side circuit 40B has the first circuit configuration or the second circuit configuration.

When the switch 408 (transistor Tr) is controlled to be on, that is, the drive battery 21 is not being charged, the voltage detected by the voltage detector 410 can have values corresponding to three respective states. Thus, the determining part 412 makes a judgment using two threshold voltages Vβ1 and Vβ2 (Vβ1>Vβ2). The threshold voltage values Vβ1 and Vβ2 are set as appropriate based on characteristic values of elements constituting the vehicle-side circuit 40A and the charger-side circuit 40B (e.g., resistance values of the resistors).

If the voltage detected by the voltage detector 410 when the switch 408 is controlled to be on is higher than or equal to the threshold voltage Vβ1, the determining part 412 determines that the vehicle-side connector 26 and the charger-side connector 36 are connected to each other or the vehicle-side circuit 40A is ground-shorted.

If the voltage is lower than the threshold voltage Vβ1 and higher than or equal to the threshold voltage Vβ2 which is lower than the threshold voltage Vβ1, the determining part 412 determines that the current state is a connector unconnected state in which the vehicle-side connector 26 and the charger-side connector 36 are not connected to each other or the vehicle-side circuit 40A is high-side-shorted.

If the voltage is lower than the threshold voltage Vβ2, the determining part 412 determines that the voltage detector 410 is in failure and has not detected the voltage correctly.

When the switch 408 (transistor Tr) is controlled to be off, that is, the vehicle-side connector 26 and the charger-side connector 36 are connected to each other and the drive battery 21 is being charged, the determining part 412 makes a judgment using the above-mentioned threshold voltage Vβ2.

If the voltage detected by the voltage detector 410 when the switch 408 is controlled to be off is higher than or equal to the threshold voltage Vβ2, the determining part 412 determines that the switch 408 is fixed to a turn-on state.

If the voltage is lower than the threshold voltage Vβ2, the determining part 412 determines that the switch 408 is operating normally.

As described above, in the connection detecting circuit 40 of FIG. 4A, discrimination cannot be made between a connector unconnected state in which the vehicle-side connector 26 and the charger-side connector 36 are not connected to each other and a high-side-shorted state of the connection detecting circuit 40.

Therefore, with the connection detecting circuit 40, when it is in a high-side-shorted state, the determining part 412 determines that the current state is a connector unconnected state even if it is in a connector connected state and hence the electrically driven vehicle 20 can be started. Thus, an erroneous start preventing function does not work properly.

Next, a connection detecting circuit 42 shown in FIG. 5A will be described. The connection detecting circuit 42 is similar in configuration to the connection detecting circuit 40 of FIG. 4A, and the components shown in FIG. 5A are given the same reference symbols as the corresponding ones shown in FIG. 4A.

The connection detecting circuit 42 of FIG. 5A is different from the connection detecting circuit 40 of FIG. 4A in that the voltage detector 410 detects a voltage at the connection point of the resistor 404 and the connecting part 40C rather than the connection point of the resistor 404 and the switch 408.

Figure 5B:
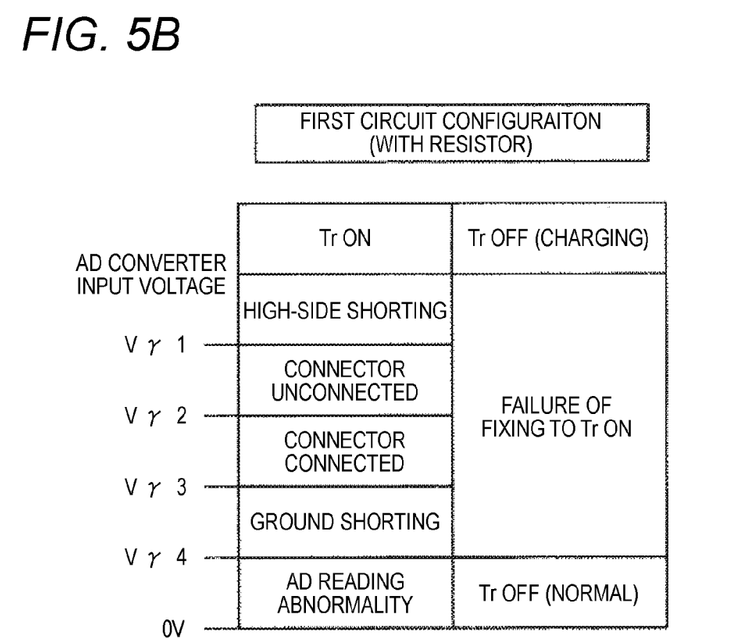
FIGS. 5B and 5C show how a determining part 412 makes a judgment.
Figure 5C:
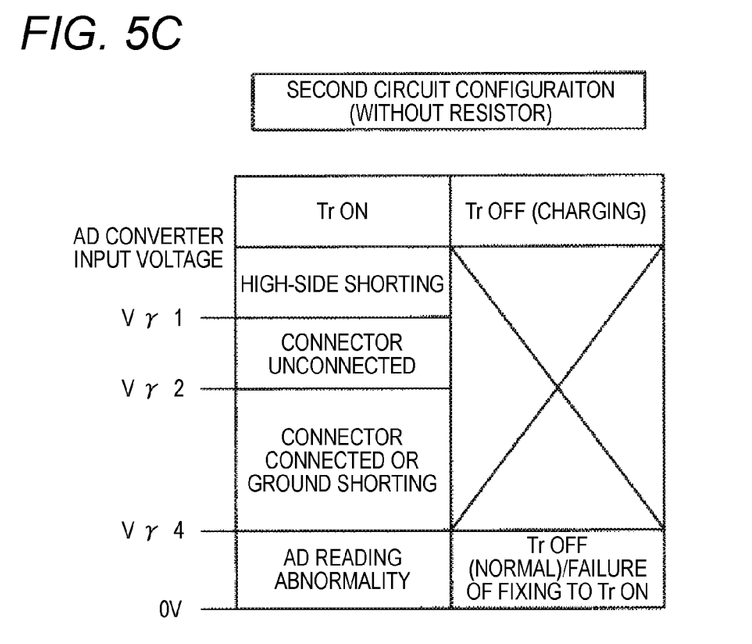

FIGS. 5B and 5C show how the determining part 412 makes a judgment. In the connection detecting circuit 42 of FIG. 5A, the relationship between the voltage and the judgment result is different between the case that the charger-side circuit 40B has the first circuit configuration and the case that it has the second circuit configuration. FIGS. 5B and 5C show how the determining part 412 makes a judgment in the case where the charger-side circuit 10B has the first circuit configuration and in the case where the charger-side circuit 10B has the second circuit configuration, respectively.

In the case of the first circuit configuration (see FIG. 5B), when the switch 408 (transistor Tr) is controlled to be on, that is, the drive battery 21 is not being charged, the voltage that is detected by the voltage detector 410 can have values corresponding to five respective states. Thus, the determining part 412 makes a judgment using four threshold voltages Vγ1, Vγ2, Vγ3, and Vγ4, (Vγ1>Vγ2>Vγ3>Vγ4). The threshold voltage values Vγ1, Vγ2, Vγ3, and Vγ4 are set as appropriate based on characteristic values of elements constituting the vehicle-side circuit 40A and the charger-side circuit 40B (e.g., resistance values of the resistors).

If the voltage detected by the voltage detector 410 when the switch 408 is controlled to be on is higher than or equal to the threshold voltage Vγ1, the determining part 412 determines that the connection detecting circuit 42 is high-side-shorted.

If the voltage is lower than the threshold voltage Vγ1 and higher than or equal to the threshold voltage Vγ2 which is lower than the threshold voltage Vγ1, the determining part 412 determines that the current state is a connector unconnected state in which the vehicle-side connector 26 and the charger-side connector 36 are not connected to each other.

If the voltage is lower than the threshold voltage Vγ2 and higher than or equal to the threshold voltage Vγ3 which is lower than the threshold voltage Vγ2, the determining part 412 determines that the vehicle-side connector 26 and the charger-side connector 36 are connected to each other.

If the voltage is lower than the threshold voltage Vγ3 and higher than or equal to the threshold voltage Vγ4 which is lower than the threshold voltage Vγ3, the determining part 412 determines that the connection detecting circuit 42 is ground-shorted.

If the voltage is lower than the threshold voltage Vγ4, the determining part 412 determines that the voltage detector 410 is in failure and has not detected the voltage correctly.

When the switch 408 (transistor Tr) is controlled to be off, that is, the vehicle-side connector 26 and the charger-side connector 36 are connected to each other and the drive battery 21 is being charged, the determining part 412 makes a judgment using the above-mentioned threshold voltage Vγ4.

If the voltage detected by the voltage detector 412 when the switch 408 is controlled to be off is higher than or equal to the threshold voltage Vγ4, the determining part 412 determines that the switch 408 is fixed to a turn-on state.

If the voltage is lower than the threshold voltage Vγ4, the determining part 412 determines that the switch 408 is operating normally.

That is, where the charger-side circuit 40B has the first circuit configuration, the connection detecting circuit 42 can make a judgment in the same manners as the connection detecting circuit 10 of FIG. 1 does.

Next, referring to FIG. 5C, a description will be made of how the determining part 412 makes a judgment in the case of the second circuit configuration.

When the switch 408 (transistor Tr) is controlled to be on, in the case of the second circuit configuration there is no potential difference between the state that the vehicle-side connector 26 and the charger-side connector 36 are connected to each other and the state that the vehicle-side circuit 40A is ground-shorted. Thus, the determining part 412 determines using three threshold voltages Vγ1, Vγ2, and Vγ4, (the threshold voltage Vγ3 is not used; Vγ1>Vγ2>Vγ4).

If the voltage detected by the voltage detector 410 when the switch 408 is controlled to be on is higher than or equal to the threshold voltage Vγ1, the determining part 412 determines that the connection detecting circuit 42 is high-side-shorted.

If the voltage is lower than the threshold voltage Vγ1 and higher than or equal to the threshold voltage Vγ2, the determining part 412 determines that the current state is a connector unconnected state in which the vehicle-side connector 26 and the charger-side connector 36 are not connected to each other.

If the voltage is lower than the threshold voltage Vγ2 and higher than or equal to the threshold voltage Vγ4, the determining part 412 determines that the vehicle-side connector 26 and the charger-side connector 36 are connected to each other or the connection detecting circuit 42 is ground-shorted.

If the voltage is lower than the threshold voltage Vγ4, the determining part 412 determines that the voltage detector 410 is in failure and has not detected the voltage correctly.

On the other hand, when the switch 408 (transistor Tr) is controlled to be off, the voltage detected by the voltage detector 410 is lower than the threshold voltage Vγ4. Therefore, the determining part 412 cannot determine whether the switch 408 is operating normally or fixed to a turn-on state. Where the switch 408 is fixed to a turn-on state, a bypass circuit as shown in FIG. 6 is formed.

In contrast, in the connection detecting circuit 10 according to the embodiment, discrimination can be made between a connector unconnected state in which the vehicle-side connector 26 and the charger-side connector 36 are not connected to each other and a high-side-shorted state of the connection detecting circuit 10. It is therefore possible to let an erroneous start preventing function to work reliably.

Furthermore, even in the case where the charger-side circuit 10B has the second circuit configuration in which it is not provided with the charger-side resistor 124, the connection detecting circuit 10 can determine that the switch 108 is fixed to a turn-on state and hence formation of a bypass circuit can be prevented.

As described above, in the connection detecting circuit 10 according to the embodiment, the vehicle-side circuit 10A is equipped with the two resistors 104 and 106 and a state of connection between the vehicle-side connector 26 and the charger-side connector 36 and occurrence/non-occurrence of a failure in the connection detecting circuit 10 are determined by detecting a voltage at the connection point of the resistors 104 and 106.

Therefore, when the switch 108 is controlled to be on, discrimination can be made between a connector unconnected state in which the vehicle-side connector 26 and the charger-side connector 36 are not connected to each other and a high-side-shorted state of the connection detecting circuit 10. This is advantageous in letting an erroneous start preventing function to work reliably.

When the switch 108 is controlled to be off, it becomes possible to determine whether the switch 108 is operating normally or fixed to a turn-on state. This is advantageous in preventing formation of a current bypass circuit with another signal line.

In the connection detecting circuit 10, the resistance of the second resistor 106 which is relatively closer to the connecting part 10C is smaller than that of the first resistor 104 which is relatively closer to the power source. This is advantageous in obtaining a stable detection result by reducing noise at the time of voltage detection.

Where the charger-side circuit 10B has the first circuit configuration, the connection detecting circuit 10 can detect each of a state that the vehicle-side connector 26 and the charger-side connector 36 are not connected to each other, a state that the vehicle-side connector 26 and the charger-side connector 36 are connected to each other, ground shorting of the connection detecting circuit 10, and fixing of the switch 108 to a turn-off state or a failure of the voltage detector 110. This is advantageous in recognizing, in detail, a state of connection between the connectors 26 and 36 and a state of the connection detecting circuit 10.

The connection detecting circuit 10 can determine occurrence/non-occurrence of fixing of the switch 108 to a turn-on state, which is advantageous in preventing formation of a current bypass circuit with another signal line.

The connection detecting circuit 10 uses the switch 108 which is a transistor. This is advantageous over the case of using a mechanical switch in increasing the on/off switching speed of the switch 108 and lowering the probability that, for example, the switch 108 is fixed to a certain state due to heat, for example.

In the connection detecting circuit 10, the switch is controlled to be off while the vehicle-side connector 26 and the charger-side connector 36 are connected to each other and the drive battery 21 is being charged from the external charger 30. And the switch is controlled to be on while the drive battery 21 is not being charged from the external charger 30. This is advantageous in preventing occurrence of a bypass circuit by disabling a current to flow through the connection detecting circuit 10 during charging.

What is claimed is:

1. A circuit, comprising:
   a vehicle-side connecting part provided in an electrically driven vehicle;
   a charger-side connecting part provided in an external charger, the charger-side connecting part being configured to be connected to the vehicle-side connecting part to supply power to a battery installed in the electrically driven vehicle; and
   a vehicle-side circuit, provided at the electrically driven vehicle, and configured to be connected to the charger-side connector via the vehicle-side connecting part and the charger-side connecting part, the vehicle-side circuit being grounded in a state that the vehicle-side connecting part and the charger-side connecting part are connected to each other,
   wherein the vehicle-side circuit includes:
   a power source;
   a switch electrically connected to the power source and turns on or off current supply from the power source;
   a first resistor electrically connected between the switch and the vehicle-side connecting part;
   a second resistor electrically connected to the first resistor in series between the first resistor and the vehicle-side connecting part;
   a voltage detector which detects a voltage at a connection point of the first resistor and the second resistor; and
   a determining part which determines a state of connection between the vehicle-side connecting part and the charger-side connecting part and occurrence of a failure in the vehicle-side circuit based at least in part on the voltage detected by the voltage detector and an on/off state of the switch.

2. The circuit according to claim 1, wherein
   the second resistor is electrically connected between the first resister and the vehicle-side connecting part, and is smaller in resistance than the first resistor.

3. The circuit according to claim 1, wherein
   a charger-side resistor is connected to the charger-side connecting part, and
   the determining part, when the switch is controlled to be on,
   determines that the vehicle-side circuit is in failure if the detected voltage is higher than or equal to a first threshold voltage,
   determines that the vehicle-side connecting part and the charger-side connecting part are not connected to each other if the detected voltage is lower than the first threshold voltage and higher than or equal to a second threshold voltage that is lower than the first threshold voltage,
   determines that the vehicle-side connecting part and the charger-side connecting part are connected to each other if the detected voltage is lower than the second threshold voltage and higher than or equal to a third threshold voltage that is lower than the second threshold voltage, and
   determines that the vehicle-side circuit is in failure if the detected voltage is lower than the third threshold voltage.

4. The circuit according to claim 2, wherein
   a charger-side resistor is connected to the charger-side connecting part, and
   the determining part, when the switch is controlled to be on,
   determines that the vehicle-side circuit is in failure if the detected voltage is higher than or equal to a first threshold voltage,
   determines that the vehicle-side connecting part and the charger-side connecting part are not connected to each other if the detected voltage is lower than the first threshold voltage and higher than or equal to a second threshold voltage that is lower than the first threshold voltage,
   determines that the vehicle-side connecting part and the charger-side connecting part are connected to each other if the detected voltage is lower than the second threshold voltage and higher than or equal to a third threshold voltage that is lower than the second threshold voltage, and determines that the vehicle-side circuit is in failure if the detected voltage is lower than the third threshold voltage.

5. The circuit according to claim 3, wherein
the determining part, when the switch is controlled to be off, determines that the vehicle-side circuit is in failure if the detected voltage is higher than or equal to a fourth threshold voltage that is lower than the third threshold voltage.

6. The circuit according to claim 4, wherein
the determining part, when the switch is controlled to be off, determines that the vehicle-side circuit is in failure if the detected voltage is higher than or equal to a fourth threshold voltage that is lower than the third threshold voltage.

7. The circuit according to claim 1, wherein
the switch is a transistor.

8. The circuit according to claim 1, wherein
the switch is controlled to be off when the vehicle-side connecting part and the charger-side connecting part are connected to each other and the battery is being charged from the external charger, and is controlled to be on when the battery is not being charged from the external charger.

9. The circuit according to claim 2, wherein
the switch is controlled to be off when the vehicle-side connecting part and the charger-side connecting part are connected to each other and the battery is being charged from the external charger, and is controlled to be on when the battery is not being charged from the external charger.

10. The circuit according to claim 3, wherein
the switch is controlled to be off when the vehicle-side connecting part and the charger-side connecting part are connected to each other and the battery is being charged from the external charger, and is controlled to be on when the battery is not being charged from the external charger.

11. The circuit according to claim 4, wherein
the switch is controlled to be off when the vehicle-side connecting part and the charger-side connecting part are connected to each other and the battery is being charged from the external charger, and is controlled to be on when the battery is not being charged from the external charger.

12. The circuit according to claim 5, wherein
the switch is controlled to be off when the vehicle-side connecting part and the charger-side connecting part are connected to each other and the battery is being charged from the external charger, and is controlled to be on when the battery is not being charged from the external charger.

13. The circuit according to claim 6, wherein
the switch is controlled to be off when the vehicle-side connecting part and the charger-side connecting part are connected to each other and the battery is being charged from the external charger, and is controlled to be on when the battery is not being charged from the external charger.

14. The circuit according to claim 7, wherein
the switch is controlled to be off when the vehicle-side connecting part and the charger-side connecting part are connected to each other and the battery is being charged from the external charger, and is controlled to be on when the battery is not being charged from the external charger.

15. The circuit according to claim 1, wherein
the second resistor is electrically and constantly connected to the first resistor.

* * * * *